United States Patent
Arvanitakis et al.

(10) Patent No.: US 12,476,552 B1
(45) Date of Patent: Nov. 18, 2025

(54) AC CURRENT SOURCE AND METHOD

(71) Applicant: Teglpco, LLC, Dover, DE (US)

(72) Inventors: Nicholas Joseph Wilson Arvanitakis, Cochise, AZ (US); Brad Peeters, Costa Mesa, CA (US); Chrisanthos Arvanitakis, Cochise, AZ (US)

(73) Assignee: Teglpco, LLC, Dover, DE (US)

( * ) Notice: Subject to any disclaimer, the term of this patent is extended or adjusted under 35 U.S.C. 154(b) by 0 days.

(21) Appl. No.: 19/059,557

(22) Filed: Feb. 21, 2025

(51) Int. Cl.
*H02M 5/29* (2006.01)
*H02M 5/293* (2006.01)

(52) U.S. Cl.
CPC .................................. *H02M 5/2932* (2021.05)

(58) Field of Classification Search
CPC ..... H02M 5/2932; H02M 5/451; H02M 4/452
See application file for complete search history.

(56) References Cited

U.S. PATENT DOCUMENTS

| | | | |
|---|---|---|---|
| 8,540,962 B2 | 9/2013 | Kodama | |
| 9,636,358 B2 | 5/2017 | Satoh | |
| 10,113,122 B2 | 10/2018 | Zheng | |
| 10,174,260 B2 | 1/2019 | Iversen | |
| 10,214,820 B2 | 2/2019 | Koeneman | |
| 10,322,932 B2 | 6/2019 | Gu | |
| 10,586,993 B2 | 3/2020 | Cheng | |
| 11,680,746 B2 | 6/2023 | Allidieres | |
| 11,761,097 B2 | 9/2023 | Ballantine | |
| 11,761,103 B2 | 9/2023 | Joos | |
| 11,767,599 B2 | 9/2023 | Ballantine | |
| 11,767,600 B2 | 9/2023 | Dawson | |
| 11,926,910 B2 | 3/2024 | Soerensen | |
| 11,953,157 B2 | 4/2024 | Allidieres | |
| 12,103,849 B2 | 10/2024 | Lugtigheid | |
| 12,117,239 B2 | 10/2024 | Takase | |
| 2007/0026295 A1* | 2/2007 | Angell | H01M 8/144 429/535 |

(Continued)

FOREIGN PATENT DOCUMENTS

CN 116599093 A * 8/2023 ............... H02J 3/28

OTHER PUBLICATIONS

Murray-Smith, Robert; YouTube video "Generating Hydrogen Using Magnetics" https://www.youtube.com/watch?v=N5LYT38Ex94 ; published within YouTube on May 15, 2020 including numerous written comments.

(Continued)

*Primary Examiner* — Jue Zhang
*Assistant Examiner* — Lakaisha Jackson
(74) *Attorney, Agent, or Firm* — Chris Tanner; BlueCollarIP.com

(57) ABSTRACT

A variety of AC current sources provide a controlled amount of AC output current even as a particular load may at times approach zero resistance. These AC current sources can be plugged into conventional power outlets, e.g. 60 Hz (USA) and 50 Hz (European). The AC current sources can tolerate a near-short or full-short circuit load for a brief time, without disabling itself or tripping any safety-interrupt. This is achieved by an architecture that achieves the peculiar electrical requirements needed for specific chemical reforming processes, such as vaporization of an ionic fluid. One purpose of the AC current sources is to reform a customized proton-rich ionic fluid.

10 Claims, 18 Drawing Sheets

(56) References Cited

U.S. PATENT DOCUMENTS

| | | | |
|---|---|---|---|
| 2008/0013351 A1* | 1/2008 | Alexander | H02M 7/4807 |
| | | | 363/123 |
| 2009/0189581 A1* | 7/2009 | Lawson | H02M 3/1582 |
| | | | 323/282 |
| 2010/0066319 A1* | 3/2010 | Qiu | H02M 3/1584 |
| | | | 323/272 |
| 2010/0165686 A1* | 7/2010 | Matzberger | H02M 7/219 |
| | | | 363/127 |
| 2017/0279352 A1* | 9/2017 | Kosaraju | G01R 19/16571 |
| 2020/0136637 A1* | 4/2020 | Ling | H02M 1/15 |
| 2020/0328690 A1* | 10/2020 | Venkataramanan | H02M 1/32 |
| 2022/0243871 A1 | 8/2022 | Adkins | |
| 2023/0062648 A1 | 3/2023 | Arevalo | |
| 2023/0128970 A1* | 4/2023 | Teeneti | H02M 5/2932 |
| | | | 323/234 |
| 2023/0341180 A1 | 10/2023 | Huang | |
| 2024/0383746 A1 | 11/2024 | Arvanitakis | |
| 2024/0384420 A1 | 11/2024 | Arvanitakis et al. | |

OTHER PUBLICATIONS

Non-Final Office Action posted Jan. 28, 2025 for related application #18814528.

Final Office Action posted Mar. 13, 2025 for related application #18814528.

Non-Final Office Action posted May 6, 2025 for related application #18814528.

\* cited by examiner

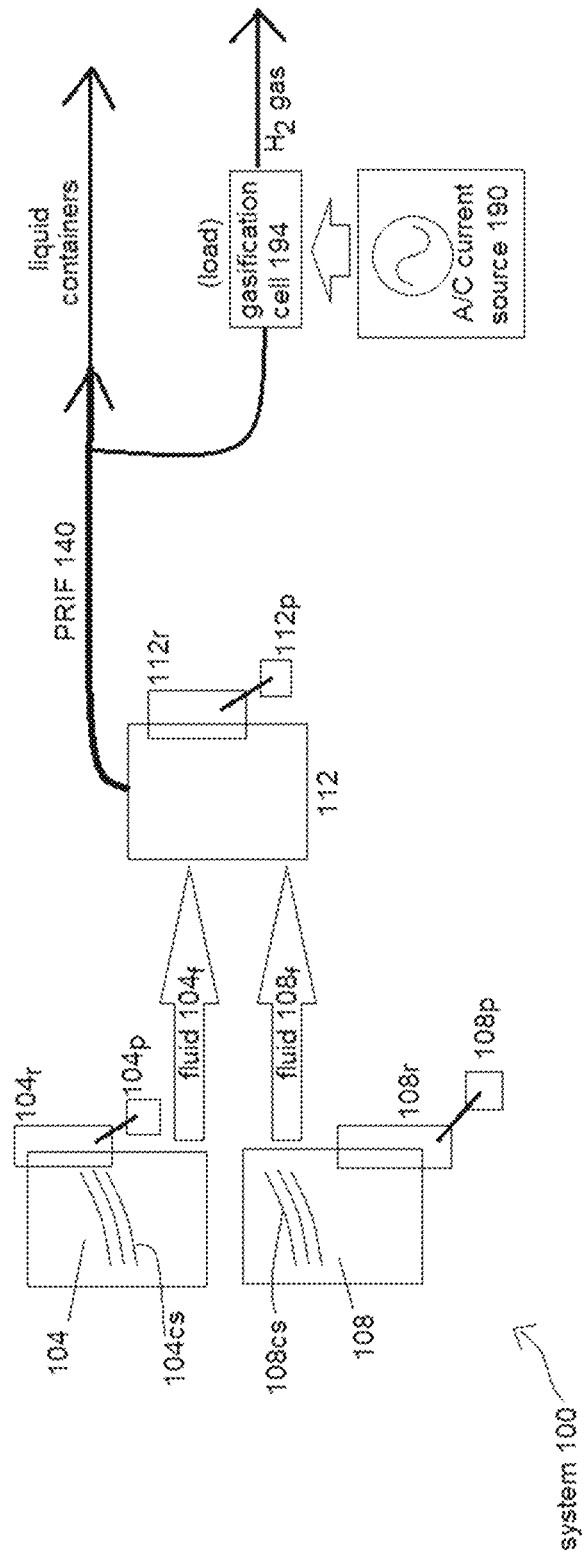

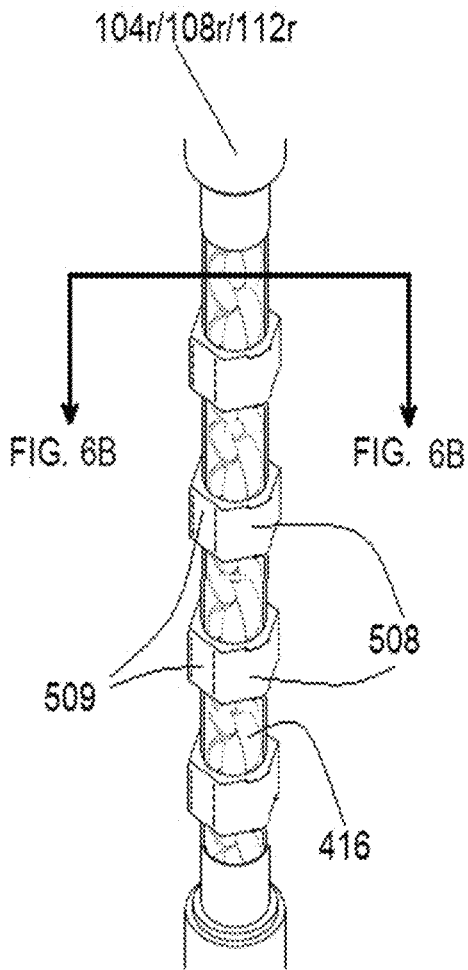
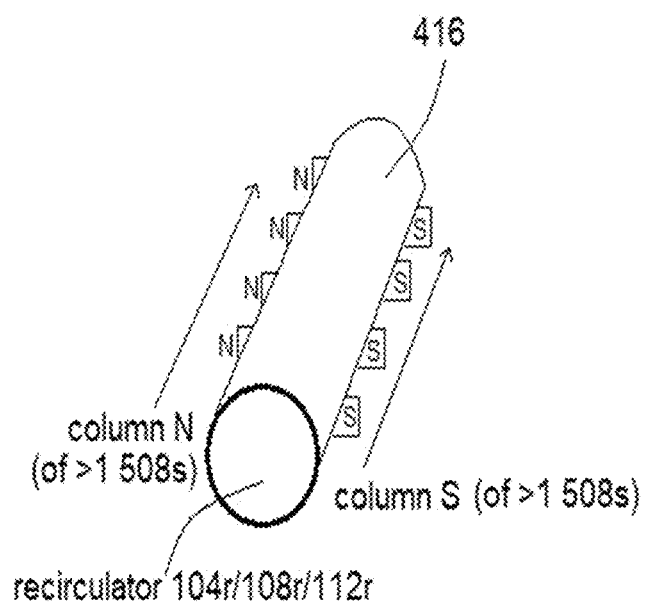
FIG. 4C
FIG. 4D

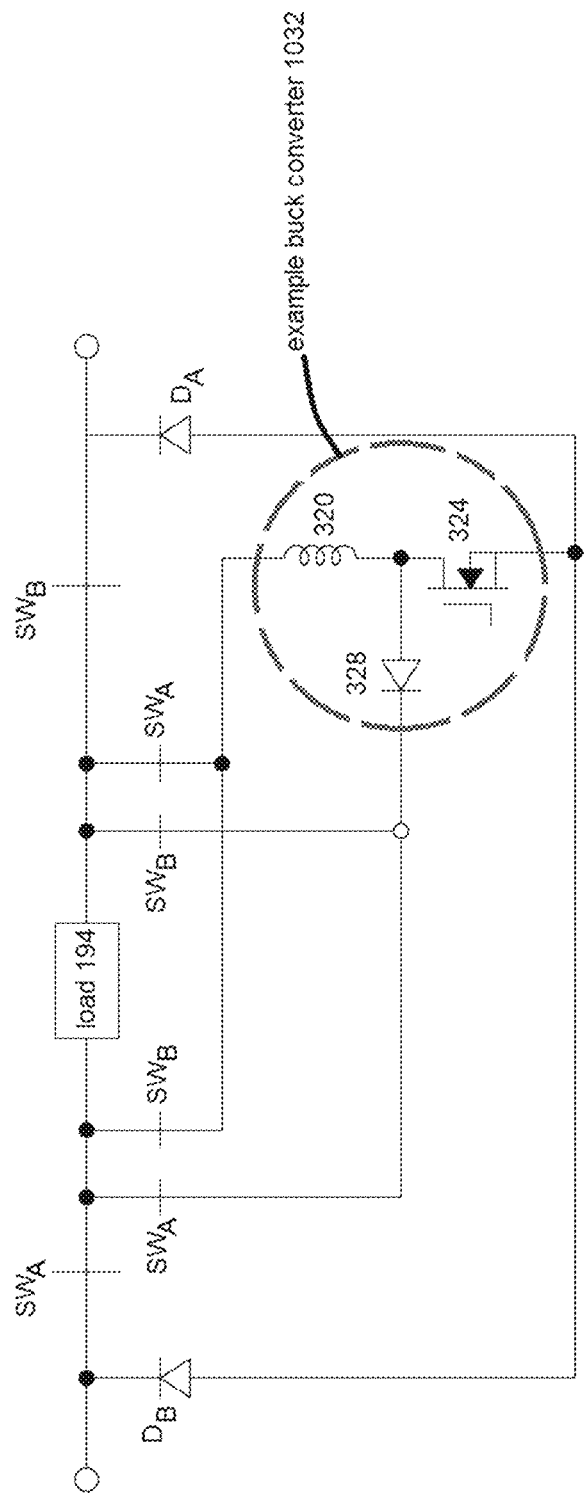
FIG. 10 (6-Active-Switch Embodiment)

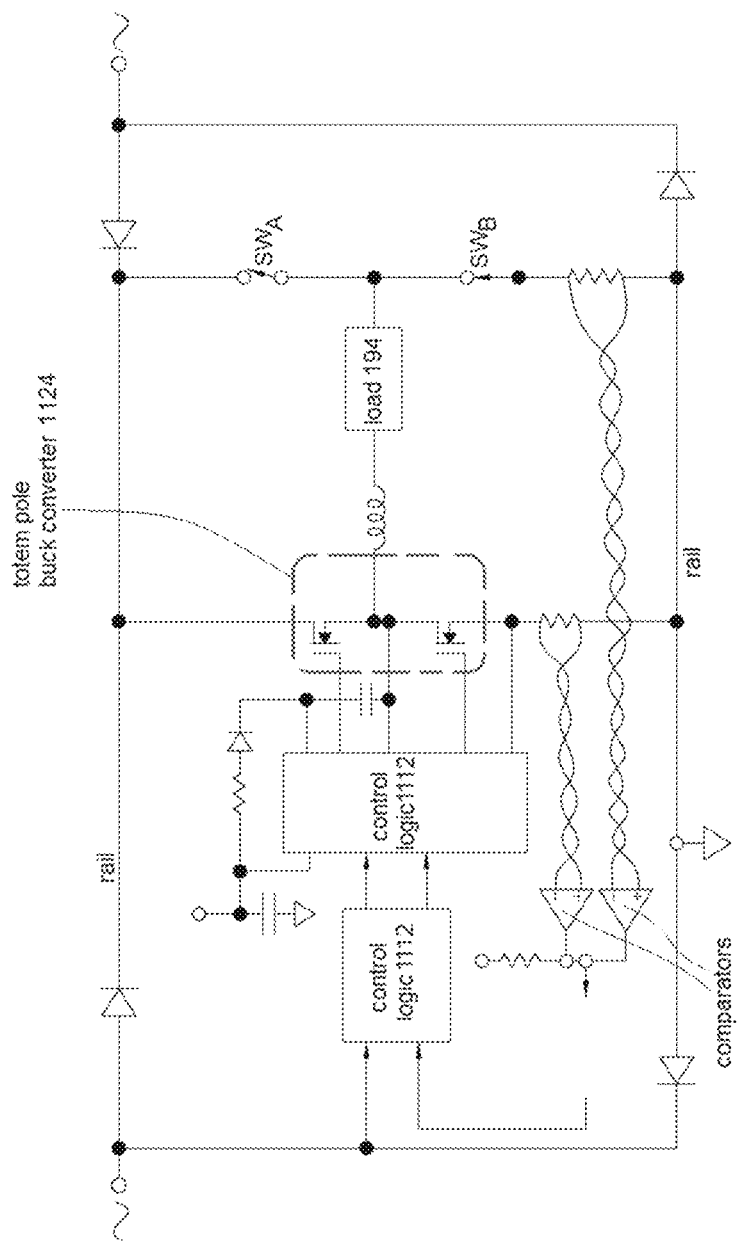
FIG. 11 (4-Active-Switch Embodiment)

AC CURRENT SOURCE AND METHOD

BACKGROUND OF THE INVENTION

It is usually a bad idea to connect the output of conventional power supplies together in an effort to increase power to a common load, unless they have been specifically engineered for this purpose. However, the AC current supply 190 isn't a conventional power supply. One thing that is conventional is that AC the current supply 190 can be plugged into any conventional AC outlet, including both 60 Hz AC (USA) and 60 Hz AC (European).

Next, gate driver chips that provide complete isolation between the AC current supply's 190 control input and output may be suitable. Unfortunately, such chips are uncommon because the conventional circuit conditions are constrained to a single, relatively constant DC power feed. Most chips take advantage of this fact to provide techniques short of complete isolation but still get the job done in the much more constrained environment of constant DC power. However, this is no help in an environment of constant AC current is needed. Consequently, an improved AC current source is desired.

SUMMARY OF THE INVENTION

The power converter(s) described herein provide a controlled amount of AC output current even as a particular load may at times approach zero resistance. Such a power converter will be pluggable into a conventional AC 60 Hz or 50 Hz wall outlet, but has to tolerate a near-short or full-short circuit load for a brief time or for unknown time periods, without disabling itself or tripping any safety-interrupt.

The embodiments herein solve this problem with a novel architecture that achieves the peculiar electrical requirements needed for specific chemical reforming processes, such as liquid to gas conversion of an ionic fluid.

The embodiments herein arose partly from the observation that a final inverter stage would have to be re-thought, including undoing some of the functions of standard upstream circuitry. Reducing stages within a single unified design cancels out the need for some of the components and would present the opportunity for simplification.

Electrolysis only occurs with DC, never AC. All electrolysis is the breaking of covalent bonds, which is expensive. Meanwhile, the PRIF 100 does not require covalent bond breaking, it only requires electron absorption. Next, AC power is cheaper than DC. It's easier to get more wattage, it's more efficient, and it doesn't require an DC→AC reform. The cheapest way to get raw electrons is AC power. One cannot do normal electrolysis with AC power. Up until now, common electrolytes, either alkaline and or acid based chemistries, can only be electrolyzed with DC power. However, using embodiments of the system 100 unlocks reforming of a Proton-Rich Ionic Fluid (PRIF) with AC power at near to zero volts.

Further, the AC power provided herein can be in the range of 60 Hz (USA) or 50 Hz (European), thus fitting with the vast majority of electrical outlets and utility-supplied power. However, the embodiments herein are not limited to this range.

One key feature of the embodiments is having ultra-high current (as measured in amps) with a sustained lower voltage, which would substantially reduce the size of the current source box. The embodiments herein contemplate supplying current as high as 1000 amps, but where the voltage is never going more than 1 v. The embodiments herein keep the output voltage to stay as low as possible, probably near 1 v or less, but still deliver amps to be stable at a very high amount.

Typically AC power supplies cannot be put on the same load (in this case a cell/gasifier) without a tremendous amount of wiring. The embodiments herein overcome this problem, and are capable of is cascading, grouping, or combining several AC current supplies in parallel on one load cell (gasifier). In such an arrangement, it becomes possible to connect 2, 3, 4, or 100 AC current supplies together and apply all of them to a single gasification-cell e.g. cell 194.

An output stage of the AC current source 190 is configured to be within a first predetermined amp-range. In instances of low or zero impedance, a load sensor ensuring the system not shutting off or overloading. The load sensor making determinations about the load and assisting in making adjustments to ensure a steady current regardless of changes in load impedance.

It is possible to have cascading and fan-out of multiple AC current supplies.

The load sensor can reduce an electrolytic chemical reaction and enhance electron-saturation to maintain nucleation on the electrolytic cell without degradation of the electrolytic cell. The load sensor ensuring the power source provides current that does not surpass a first predetermined amount and also does not go below a second predetermined amount, thereby ensuring the system acting both as a current limiting device but also as a current guaranteeing device at near zero voltage and at a dead short.

The AC current source can decrease heat loss and increase proton nucleation in the gasification call 194 by providing a set amount of current at near zero voltage.

BRIEF DESCRIPTION OF DRAWINGS

Advantages of the embodiments will be apparent from the following detailed description of the exemplary embodiments thereof, which description should be considered in conjunction with the accompanying drawings in which like numerals indicate like elements, in which the figures provide additional embodiments and images related to the content described herein.

FIGS. 1A and 1B show non-limiting arrangements of reactor systems for producing a Proton-Rich Ionic Fluid (PRIF) according to the embodiments herein;

FIGS. 2A, 2B, 2C, 3A, 3B, 4A, 4B, 4C, 4D, and 4E show detail of one or more recirculators;

FIGS. 10-11 show example buck converters.

DETAILED DESCRIPTION OF PREFERRED EMBODIMENTS

Figure 1B:
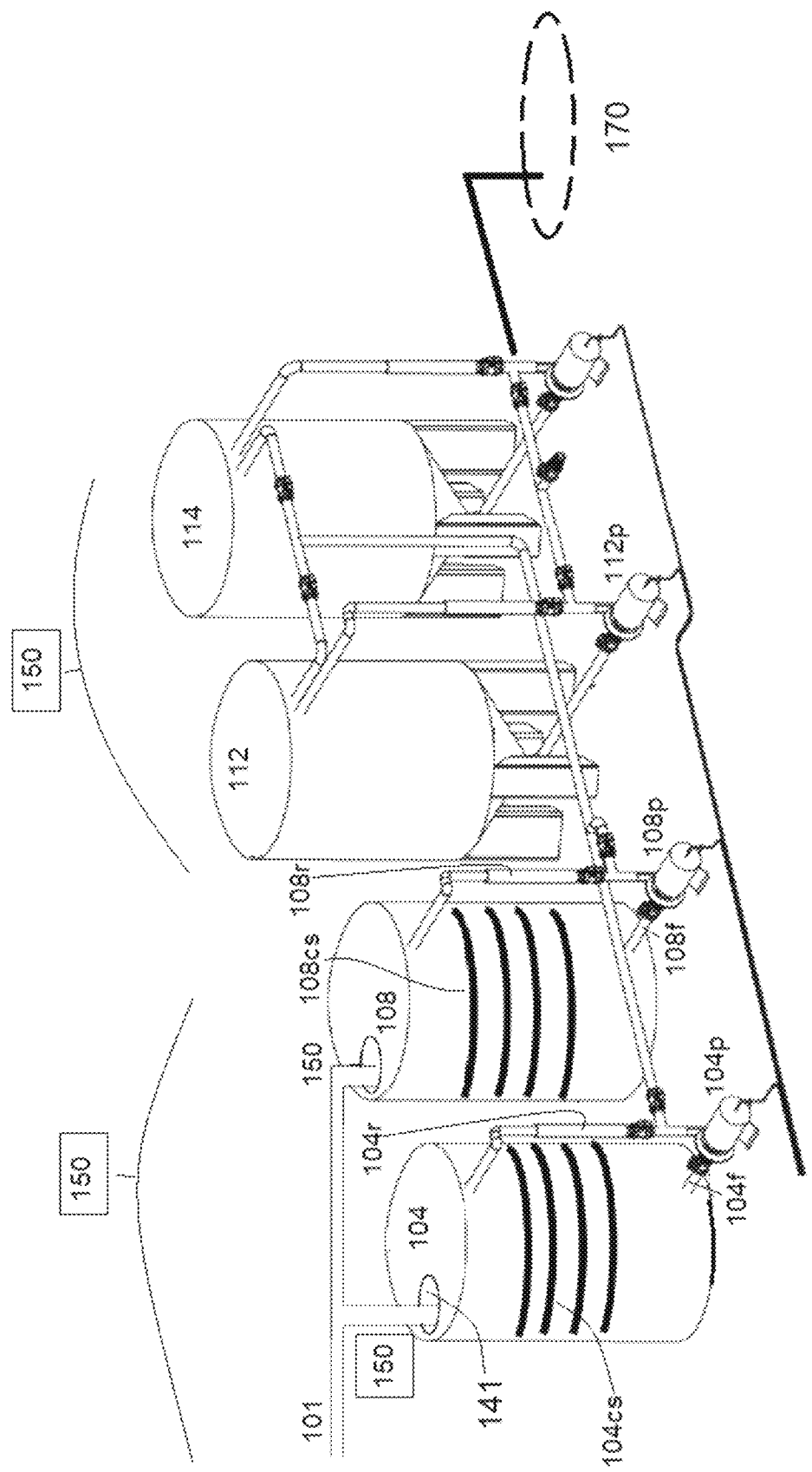

FIG. 1A shows an example method of making a Proton Rich Ionic Fluid (PRIF) 140. It is sometimes advantageous to gasify the PRIF 140, to create for example $H_2$ gas. To achieve this, as shown in FIG. 1A an AC current source 190 can be connected to a gasification cell 194.

To make the embodiments herein as universal as possible, the AC power supplied to the various AC current sources 190 described herein fit with the vast majority of electrical outlets and utility-supplied power, and can be in the range of 60 Hz (USA) or 50 Hz (European). In other words, conventional power.

The system 100 converts a common hydrogen-based input fluid 101 to the PRIF 140 comprising an overabundance of hydrogen $H_1+$ atoms, mainly just protons since atomic hydrogen does not have a neutron and the electron has been peeled off. This conversion occurs in the absence of elevated temperatures or pressures, so that the resulting PRIF 140 is suitable for shipping or storage at Standard Temperature and Pressure (STP, AKA Normal Temperature and Pressure NTP). One example period of reliable shelf-life of the PRIF 140 might be 36 months, although there could be examples of even longer shelf-life, depending on the specific formulation.

The input fluid 101 may be one of various commonly-found hydrogen-donating fluids or mixes of multiple hydrogen-donating fluids, and can also be dirty water, fracked water, and/or processed water.

Referring to FIGS. 1A and 1B, an example system 100 and flowchart includes a first tank 104, a second tank 108, a third tank 112, and corresponding recirculators 104r, 108r, 112r. Both first and second tanks 104\108 comprise recirculator 104r\108r, pump 104p\108p, and windings or inductor coils 104cs\108cs. Both first and second tanks also pump out intermediate fluids 104f\108f that has been partially-processed and is on its way to becoming the proton rich ionic fluid (PRIF) 140. FIG. 1B shows a fourth tank 114 which acts as a potential overflow tank, or storage tank, or other way of assisting in management of PRIF 140 during or after a production run thereof. In the flowcharts of FIGS. 1A-1B, all activity flows from left to right.

The tanks 104\108 have the circumferential windings 104cs\108cs applied to their outer surface thereby forming a reaction zone. The windings 104cs\108cs can be formed with stranded wire or other types of windings to act as a large-scale inductor coil. FIG. 1B also shows a seal 141 on the tank, and a detector 150. The tanks 104/108/112 can be operated at NTP/STP, but for detecting various gaseous components, the seal 141 could be helpful in trapping and capturing. The detector 150 can capture a lot of different components, as will be discussed in more detail herein.

The circumferential windings or inductor coils 104cs\108cs may be electrically coupled to a power supply so as to be electrically coupled to either alternating or direct current at a variety of frequencies. An amount of insulation on the wires and tanks, spacing between specific windings, and wire gauge all may vary according to a desired outcome.

The pumps 104p\108p are coupled to the recirculators 104r\108r which have magnetic modules 508 in various orientations attached thereto. However, the magnetic modules 508 can come in a lot of widely differing formats, of which the embodiments shown in the various FIGS herein are but non-limiting examples.

The activity within the reactor system(s) 100 result in removing electrons from the input fluid in such a way that the resulting PRIF becomes electron-deficient. This PRIF 140 can remain electron deficient at STP for varying periods, e.g. having a shelf-life of 36 months.

The circumferential windings 104cs\108cs can have a variety of voltages and currents applied thereto. The voltage applied to the windings 104cs may be equal to that applied to the windings 108cs, or may not. Further, a voltage may be applied to one set of windings but not the other, and polarity may be altered.

A pre-determined wattage for the circumferential windings 104cs\108cs can be selected based on the chemical constituents of the input fluid 101, a desired configuration of the PRIF 140, ambient temperature, volume of end-product, and other factors. As current moves through windings 104cs\108cs, a corresponding magnetic field directed perpendicularly to windings 104cs\108cs applies a magnetostatic force to liquid 101 while being circulated through the tanks 104\108 for a predetermined period of time until the outlet fluid 104f\108f is transferred via e.g. to the 3rd tank 112.

The magnetostatic forces applied to the windings 104cs\108cs can be adjusted between 2,000-80,000 Gauss, with 20,000-80,000 Gauss being a preferred range. When outlet openings 104f and 108f are opened, the fluids 104f\108f are combined into the third tank 112 which comprises a recirculator 112r and pump 112p. Once the fluid from both first tank 104 and second tank 108 are combined into the third tank 112, the combination is pumped and recirculated within the third tank 112.

Unlike the first tank 104 or second tank 108, third tank 112 does not have a circumferential windings, and therefore experiences no electrostatic effects. Instead, the third tank 112 experiences an oscillating magnetic field through the recirculator 112r due to the magnetic-modules 508 attached thereto.

During operation of the system 100, some oxygen vapes off, and goes away in a variety of forms. This is due to the fact that one purpose of the system 100 is to break the covalent bonds of a water molecule, separate out the oxygen \electrons and drive them off (prevent them from re-combining), and thus isolate protons in the form of $H_1+$. One reason this can be done at low power is because a typical water molecule is known to be a weak dipole, where some of the H can be separated from the O just by mechanical forces, some of which occur within the recirculators 104r/108r/112r.

The sensors 150 are used to affirm proper performance of the system 100, including temperature. In tank 104 there may be a slight exotherm 20-30 degrees F. based on which proton donor was used within the input fluid 101. Content of the specific chosen input fluid 101 can affect this, due to clean water v. dirty water v. produced water or other type of effluent source.

Oxygen may gas off maybe 2-3% in overall mass difference, perhaps in the format of O2 but also in other formats. Various oxygen radicals are formed during production-use of the system 100, mostly oxygen based salts, which can vary according to a wide variety of conditions including but not limited to the content of the input fluid 101. These salts end up getting excreted through the back-end portion 170 of the system 100.

In a lower-cost embodiment, the detector 150 can be focused mainly on CO2 and O2, which both have special significance in hydrogen generation. However, the detector 150 can have wider scope, depending on manufacturing considerations and end-customer preferences.

If the input fluid 101 contains sulfuric acid, that can lead to sulfate salts, colloidal sulfur, and/or sulfur dioxide. Meanwhile, produced water tends to result in carbonates, oxides, and chloride salts. Acetic acid can lead to acetate salts.

The semicircle 170 represents a combination of filters, precipitate catch mechanisms, and or hydrocyclone, which may catch any of the below. That is, a non-limiting list of specific oxygen radicals and salts (either gas or solid) given off during use of the system 100 can include but are not limited to:

hydroxide salts (_OH); carbonate salts (_CO3);
sulfate salts (_SO4); nitric salts (_NO3);
dioxides (_O2), the most of important of which is CO2;
acetates (_CH3COO—); and alkoxides (_COH alcohol salts).

The proton-donating input fluid 101 (Appendix A) can comprise many different blends and even different waters and oils thus any of these will have different sludges and precipitates.

Figure 1C:
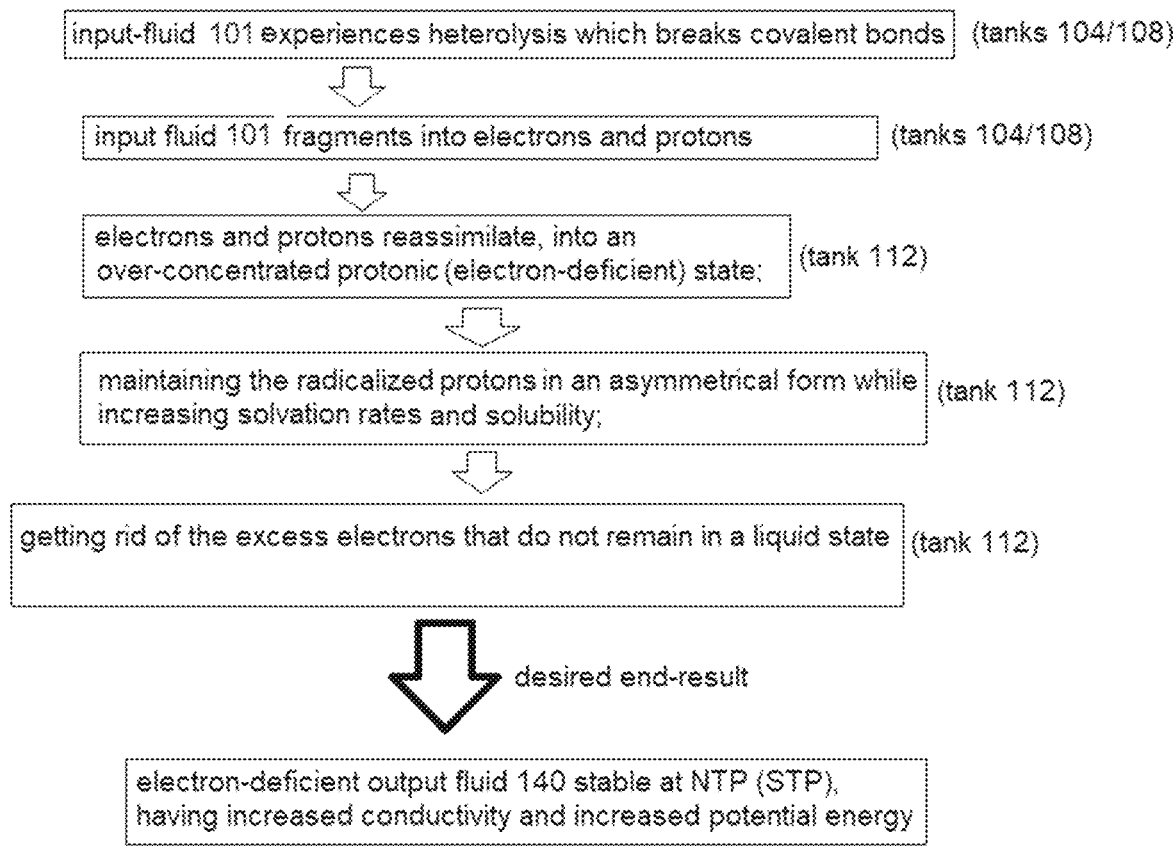
FIGS. 1C, 1D, and 1E show example methods of operation of the reactor systems of FIGS. 1A and 1B.
Figure 1D:
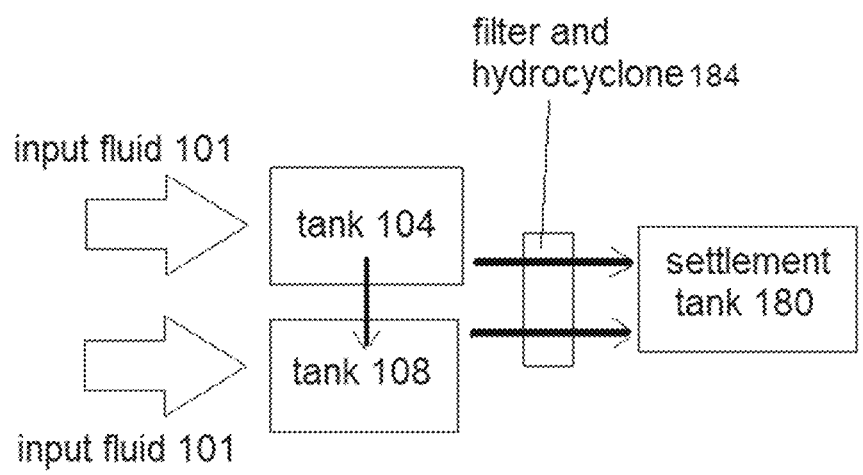
Figure 1E:
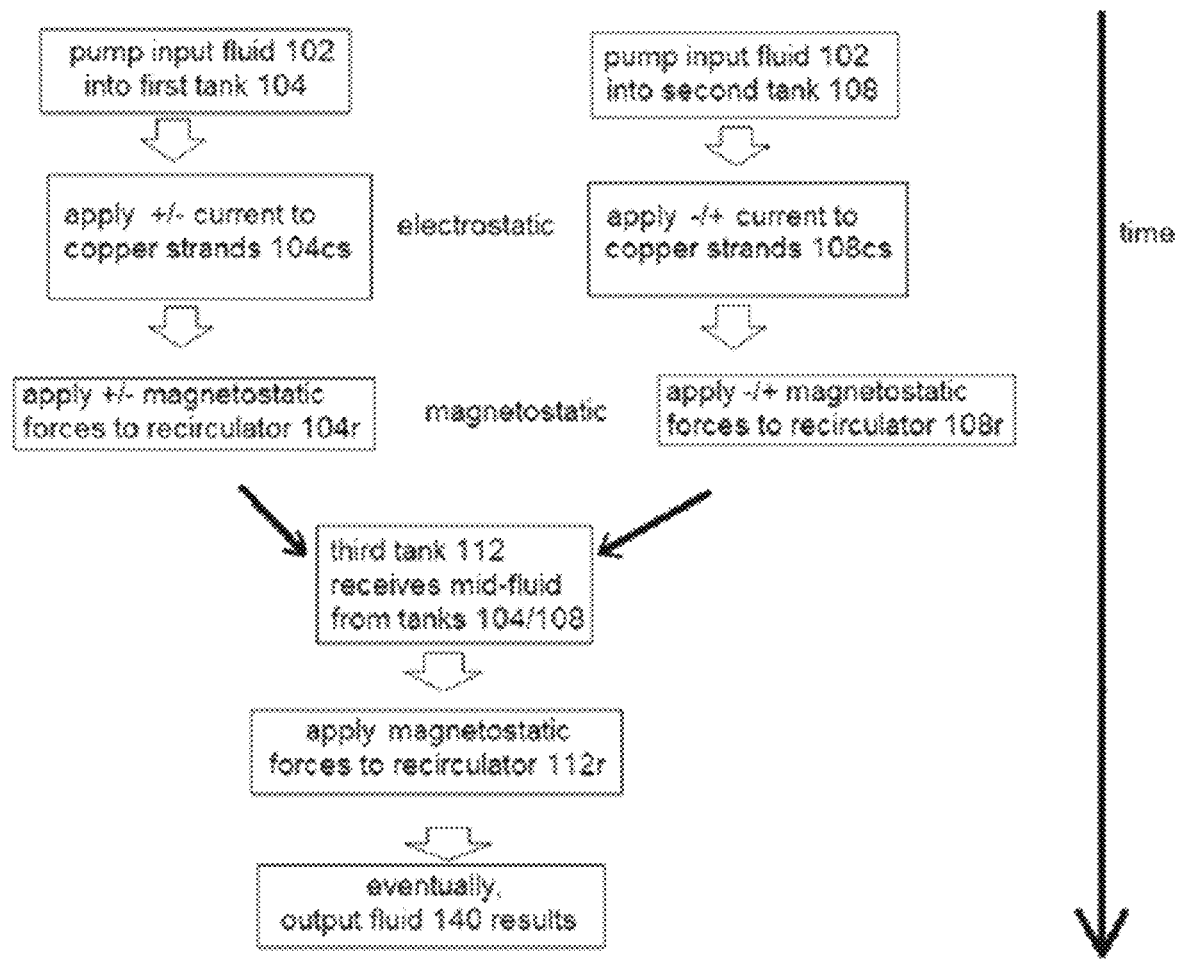

FIGS. 1C and 1D-1E show example methods of operation of the reactor systems of FIGS. 1A and 1B. Regarding the flowchart of FIG. 1D, in an embodiment, the second tank 108 might have twice the capacity of the first tank 104. An example operation of the flowchart of FIG. 1E might be where the tanks 104/108 are filled up with the input fluid 101 in equal proportions, and processed separately. The recirculators 104r/108r (not shown in FIG. 1D) could be set to opposite polarities. Then, the contents of tank 104 could be put into second tank 108 for further processing for predetermined time periods.

The second tank 108 might have the following elements added which may not be in the first tank 104: flocculants, polyacrylamides, ferric sulfates, and/or gypsum. An additional variation might be to add alcohol to the input of the first tank 104.

FIGS. 2A, 2B, 2C, 3A, 3B, 4A, 4B, 4C, 4D, and 4E show detail of the recirculators 104r, 108r, and 112r, which are sometimes referred to as static mixers. As shown at least within FIGS. 2A-C, each recirculator can be formed as an elongated translucent tube that has movable internal fluting 404 (AKA baffle) located therein. The recirculators 104r, 108r, and 112r further comprise a grommet 420 at each end, along with threaded surfaces so that they may be connected in series. The internal fluting 404 aids in restraining fluid flowing through the tubes 416 thereby forming a type of reaction zone in which covalent bonds can be broken, and heterolysis can occur (FIG. 1C). Each internal fluting 404 can be formed with a plurality of grommets 420 that can be concatenated to one another so as to form a chain structure if desired. The fluting 404 is important because it can break or at least strain the covalent bonds holding water together. It is an advantage of the embodiments herein to break the covalent bonds of the water with as little energy as possible. The fluting 404 leverages the fact that water molecule has weak dipole, a weak covalent bond.

Figure 2A:
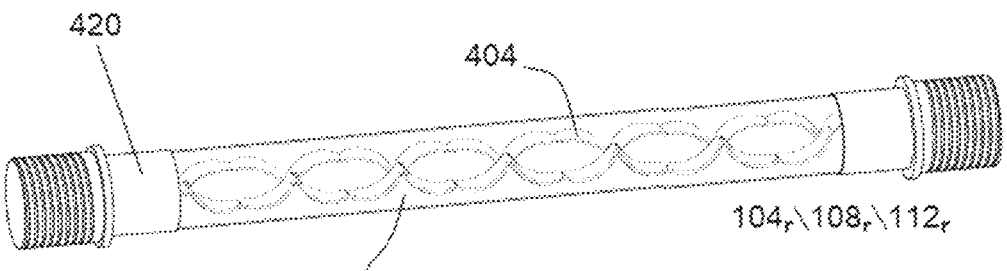
Figure 2C:
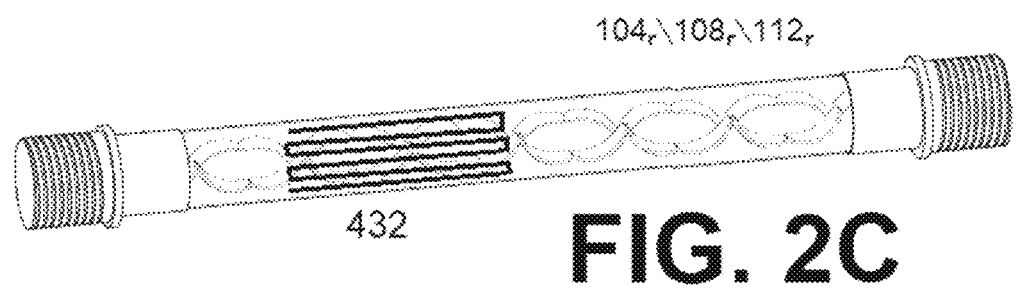
Figure 2B:
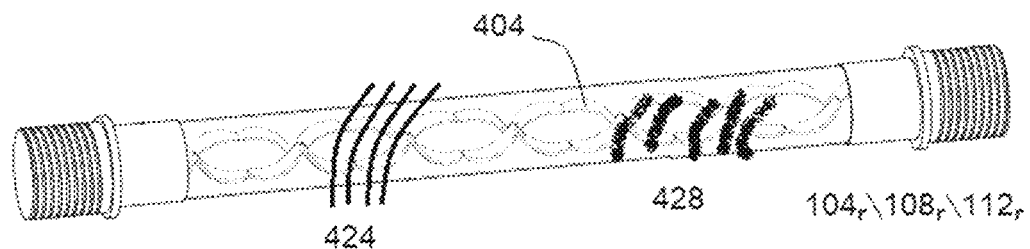

FIG. 2B shows example windings 424 and inductor coils 428 embedded within the plexiglass body (tube 416) of a recirculator. These coils 428 are configurable at a variety of polarities and electromagnetic capabilities. FIG. 4C shows another example of inductor-patterning, where an inductive mechanism 432 is configured in a "rear window defogger" serpentine configuration.

Figures 3A, 3B:
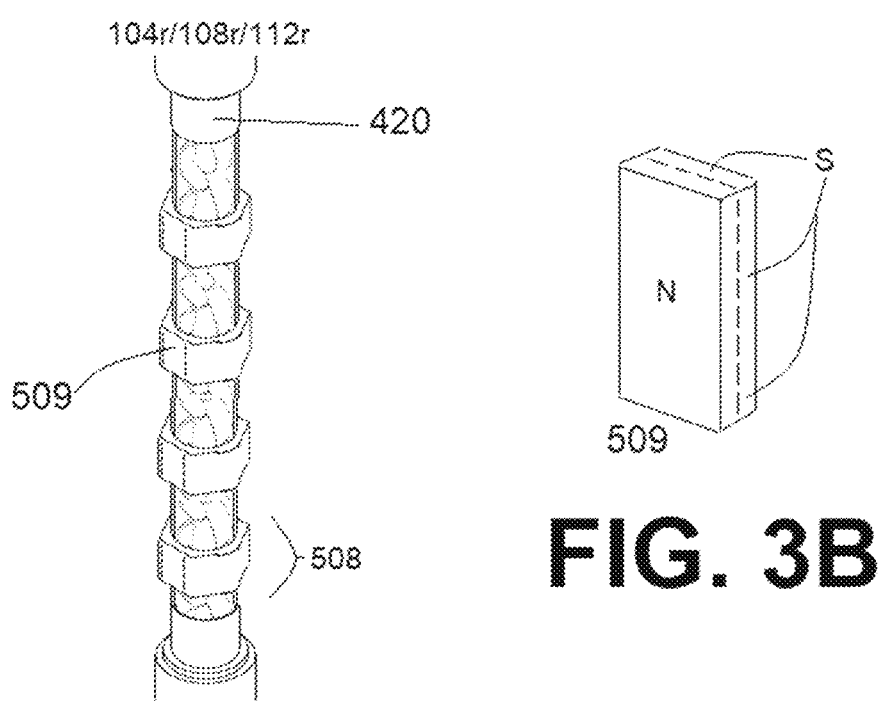
Figure 4A:
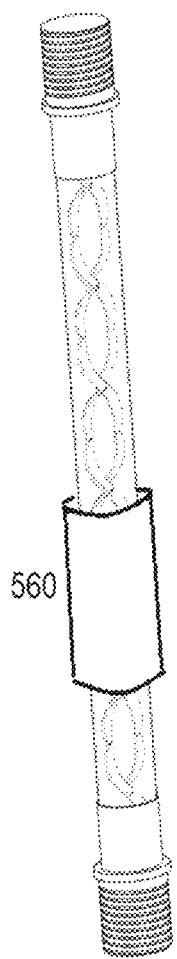
Figure 4B:
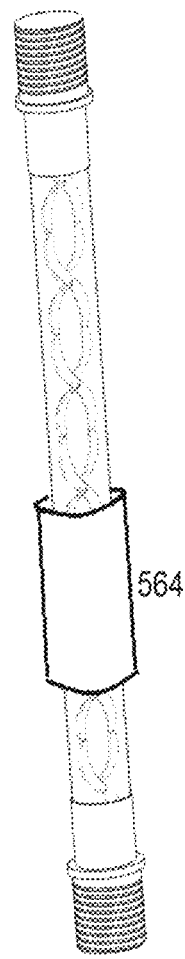

FIG. 3A shows an example recirculator with magnets 509 taped on. FIG. 3B shows an example of rectangular magnet 509 that is polarized in a way different than a domino magnet. FIG. 4A shows a recirculator with a slidable adjustable mechanical magnet-cuff 460. FIG. 4B shows a recirculator with a slidable adjustable electrical inductor-cuff 460.

The system 100 is designed to work in a variety of locations and climates, and with widely varying quality of water including unknown salinity, unknown metal content, unknown viscosity, and unknown level of pollutants. Accordingly, the magnetic modules 508 would be tunable and subject to continual adjustment. The system 100 may be used in remote areas where spare parts may be inaccessible, and may receive what small amounts of power it needs, from solar devices or off-grid devices that have varying levels of reliability. The magnetic modules 508 will have a lot of flexibility and adjustability, both mechanically and also electronically.

Moving to FIG. 3A, within any particular recirculator, the plurality of magnetic modules 508 are arranged circumferentially about the outer surface of the tube 416 and periodically located its length. In some embodiments, a magnet pack 508 is formed with one or more static bar-magnets 509 that define opposite polarities often denoted as a North and South.

The magnetic modules 508 are arranged on an outer surface of the tube 416 in specific ways. One example arrangement is where each North pole side may be facing e.g. radially inwardly, toward the center of tube 416. In this arrangement, each South pole side of a magnet or magnet group 509 would then face radially outwardly from an outer surface of the tube 416. The specific size, shape, and orientation of the individual magnets 509 can vary. FIG. 3B shows an example magnet 509 having a non-domino shape, but that is for example only.

As shown in FIG. 1C, in operation, input fluid 101 is piped into tanks 104\108 until at least partially filled. The tanks 104\108 will have a predetermined wattages applied through their respective windings 104cs\108cs for predetermined time periods, often at least 45 minutes. Often, current applied through the circumferential windings 104cs\108cs may be between 5-100 amps at a wattage between 60-1200 watts, with 100 amps at 1,000 watts being advantageous. FIG. 1E shows another way of interpreting the flow within the system 100

During use, the recirculating pumps 104p\108p move the input fluid 101 through the tanks 104\108 via the recirculators 104r\108r. These in turn apply a uniform static magnetic field to input liquid 101 via the magnets 508.

A polarity applied to the recirculator 104r may be opposite the polarity applied recirculator 108r. In one embodiment, recirculator 104r will be set with North pole sides 193 facing radially inwardly applying a total of 46,000 Gauss to input liquid 101, while the recirculator 108r will be set with South pole sides facing radially inwardly thereby applying a total of 46,000-58,000 Gauss to the input liquid 101.

Continuing this example, constant recirculation of the input fluid 101 from the tanks 104\108 through recirculators 104r\108r causes a non-transitory polar imbalance in the input liquid 101 resulting from breaking the weak dipole known to be present in water. The differences in fluid velocities within recirculators 104r\108r thus creates a separation and segregation of atomic hydrogen $H_1+$ within the input fluid 101.

The reactor system(s) 100 can be operated with a variety of ranges and thus have a lot of configurability and ability to be customized for specific types of production runs of the PRIF 140, and also can be adapted to specific types of input fluid 101. As stated, typically, the input fluid 101 will be a hydrogen-donating fluid. Further, each of the first, second, and third recirculators 104r\108r\112r can separately apply a pre-configured magnetic field to the fluid circulating therein, therefore creating a separate proton-rich vortex within each of the plurality of tanks 104\108\112. These pre-configured magnetic fields can be adjusted applied by the recirculators can be auto-adjusting. Further, if the right levels of intermediate fluids 104f\108f are occurring, the magnetic fields can be shut off entirely.

Figure 4E:
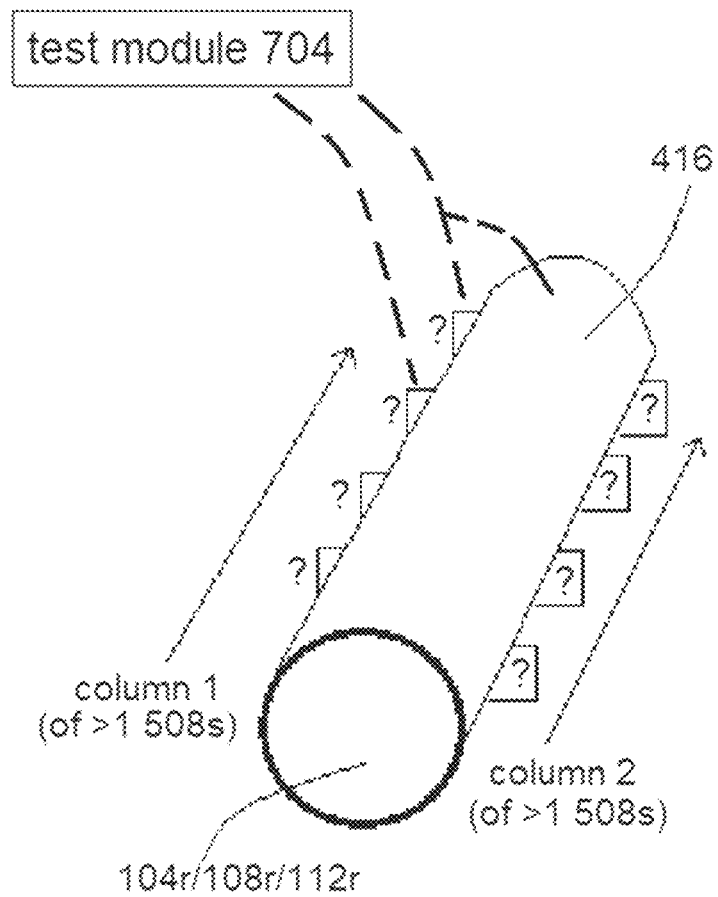

The specific magnetic field applied may vary according to characteristics of the input fluid 101. A key factor is that heterolysis (FIG. 1C) occurs and breaks the covalent bonds in the water-portions of the input fluid. Subjecting the input fluid 101 to a magnetic field provides a low-cost non-$CO_2$-creating way of doing this. FIGS. 4A-4D show example recirculators 104r/108r/112r and FIG. 4E shows a testing module 704 that can affect production of the PRIF 140 in real-time. Under the right circumstances, the inductors of FIG. 4E can be re-oriented in a variety of patterns and polarities, hence the question-marks of FIG. 4E. The recirculator of FIG. 4E is patterned to look similar to FIG. 4D, which shows static magnets with known fixed polarities, but that is for illustration-only and the embodiments herein should not be considered as limited exclusively thereto. Instead, FIG. 4E should be interpreted to borrow from the example of FIG. 4D, but expand it to show a variety of configurations and adjustable features including not being committed to a specific polarity. The embodiment of FIG. 4E shows a test module 704 and columns of magnetic modules 508 that can be changed depending on feedback from the test module.

The testing module 704 of FIG. 4E can sense breaking of covalent bonds, other factors, and can adjust magnetic or electromagnetic fields and polarities in order to achieve a desired content of PRIF 140.

The testing module 704 can comprise a mass gas analyzer, ammonia or peroxide analyzers, and potentially API testing. API testing can include high-resolution mass spectrometry, liquid chromatography, high-performance thin-layer chromatography (HPTLC), and stability testing.

Fake Green Hydrogen

The expression "Fake green hydrogen" refers to a situation where a company or entity claims to be producing "green hydrogen" meaning where the process requires minimal energy and gives off minimal $CO_2$ but is actually generating it through e.g. fossil fuels. This is essentially misleading consumers about the true sustainability of their product and also the amount of $CO_2$ given off. Another expression is "greenwashing" of hydrogen production.

Companies sometimes label hydrogen produced from fossil fuels as "green" to appear more environmentally friendly, to gain tax advantages, and to not reveal the amount of CO2 given off.

It can be difficult to confirm whether a company is truly producing green hydrogen as advertised. Most hydrogen is produced in the form of H2 gas that is produced by electrolysis. Certification entities are sometimes employed to provide verification and assurance that the company is using verifiable renewable energy sources to power their electrolysis process.

In sharp contrast, when using the PRIF 140, there is no electrolysis. Second, there is no $CO_2$ given off. The various $CO_2$ monitors 150 shown in e.g. FIG. 1B would affirm that. Further, the PRIF 140 is single $H_1$+ not H2 gas, thus does not require cracking the H2 gas.

There exists another factor in affirming authentic green Hydrogen, meaning truly green and not "astroturf" or artificially green. This factor involves proving out that the H2 gas was not even partially derived from SMR and Haber Bosch processes, as these both produce huge amounts of CO2. This is sometimes referred to as greenwashing. In order to seem more green, some entities hide their base-origins and hide the amount of coal burned to produce the hydrogen.

CO2 Measurements

To address this, the system 100 features CO2 sensors 150 embedded at numerous locations within the system 100.

It is difficult to accurately measure gas contaminants. However, a single analyzer 150 for multiple natural gas contaminants can achieve accurate and reliable measurement. If necessary, the tanks can use the seal 141 to have an accurate inventory of everything given off within that specific tank. Further, the test data can be transferred in a tamper-proof way that cannot be overwritten, which is helpful for affirming authentic green hydrogen. The gas analyzer 150 is introduced mainly for CO2 detection, but can be used for many other purposes as well.

Using conventional household AC from conventional outlets for the AC current source 190 is helpful, but requires some depth to explain. Accordingly, FIG. 10 represents a stepping stone to solving the AC-DC conflict between the requirements of the gasification cell 194 and the capabilities of a buck converter circuit 1032.

FIG. 11 is another interim step trying to get closer to the ideal of an AC-capable buck converter that delivers power in the range of 60 Hz (USA) or 50 Hz (European) but with stabilized current. In FIG. 11, the four diodes count as switching elements albeit passive switches rather than "active" switches. The embodiment of FIG. 11 still uses diodes to convert incoming AC to DC for processing by the buck converter 1124 and then uses a "partial bridge" comprising the two $SW_A$ $SW_B$ elements.

The embodiment of FIG. 11 uses custom control logic 1112 to operate the switches appropriately as their roles alternate 120 times per second with the AC power. FIG. 11 embraces the concept of a symmetrical totem pole for the buck converter where the two transistors take turns playing the role of high-side switch versus low-side switch depending on which half-cycle of the AC power is currently active.

Figure 5A:
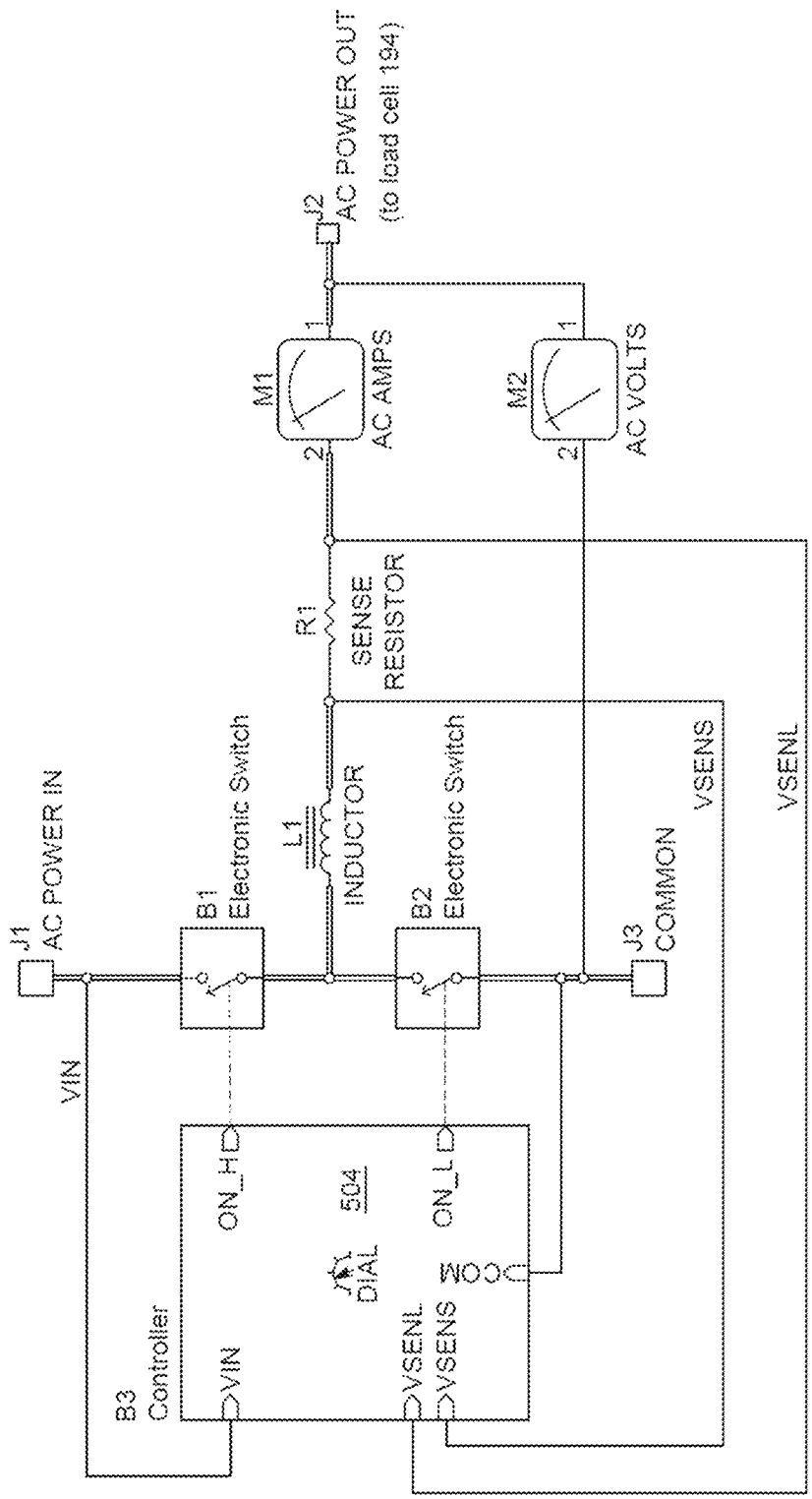
FIGS. 5A-5B show an example AC current source.
Figure 5B:
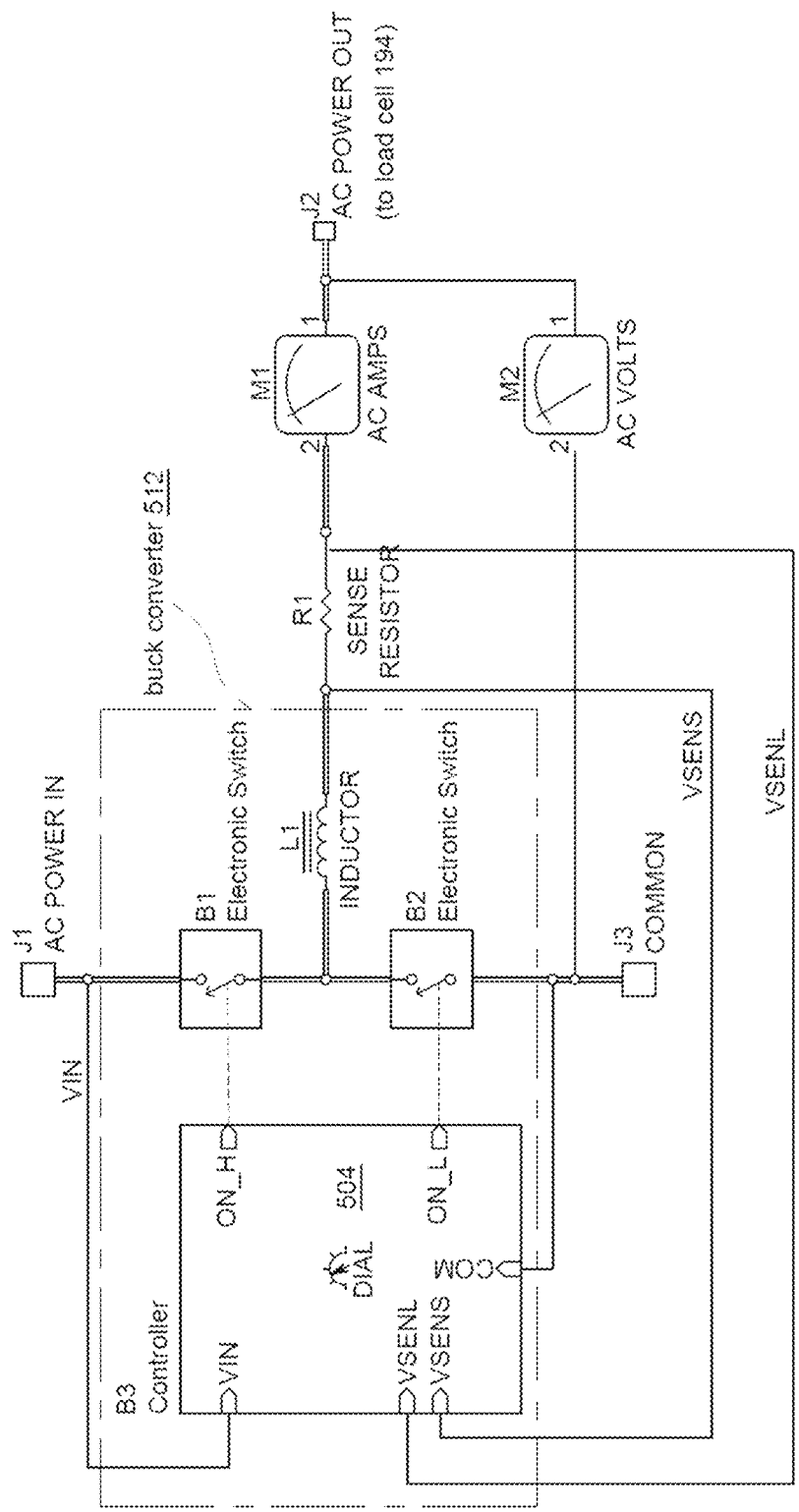

FIGS. 5A-5B shows an AC current source 190 which solves all the problems mentioned herein. Within this disclosure, FIGS. 5A-5B will be first be discussed in their overall context, and be the subject of the independent claim and a few dependent claims. Afterwards, FIGS. 6-9 will discuss various components within FIGS. 5A-5B, and be the subject of some dependent claims.

A principal innovation of the various AC current supplies 190 described herein is the application of SMPS (Switch Mode Power Supply) technology in a unique and novel way to achieve current-controlled AC power output rather than voltage-controlled DC power output. This result is achieved without the conversion of AC power to DC power then back to AC power. Instead, the embodiments herein operate directly with incoming wall-outlet AC power thereby providing the desired AC output current to the load cell 194.

FIGS. 5A-5B shows a sense resistor R1 which is a low-valued resistor placed in the path to the load cell 194 so that the voltage developed across this resistor can be measured by the controller B3 in order for the controller B3 to know how much current is being delivered at any given instant. The controller B3 uses this information to drive the switches B1 B2 in the totem pole to achieve the level setting current in the load cell 194 as specified by the control knob 504 within the controller B3.

FIG. 5B shows the switches B1 B2 and where they are located within the buck converter 512.

FIGS. 5A-5B shows sight meters M1 and M2 that provide users a quick way to observe the voltage on the load and the current being provided to the load by the module. These make the AC current source 190 easier to operate, debug, and re-configure where necessary.

In FIGS. 5A-5B the totem pole switches B1\B2 are shown with generic switch symbols because that is their main function, although they are semiconductor devices. This is to make the circuits in FIGS. 5A-5B clearer and easier to understand, even though the switches B1\B2 actually contain complex semiconductors. A generic switch is agnostic to the polarity of the voltage across it or the direction of the current through it. That is a key which makes the AC current supply 190 functional. A semiconductor device can readily be used as a switch, but specific arrangements of the voltages and current flows are usually required. Arbitrary reversal of the applied voltage 120 would normally not be allowed with semiconductor devices. But the switches B1\B2 solve this problem, albeit in a complex way.

FIG. 5B shows Applicant's proprietary non-traditional buck converter 512. This buck converter 512 comprises two switching devices, an inductor L1, and a control circuit B3. The two switching elements B1\B2 are arranged in what is commonly called a "totem pole" arrangement. B1 is the upper element ("high side") of the totem pole and B2 is the lower element ("low side"). The lower element in the totem pole is an active switch used to improve performance, efficiency, and preclude converting from AC to DC and back to AC.

While not shown in FIGS. 5A-5B, the power conversion system 190 has three terminals: input, output and common.

This completes the overview of FIGS. 5A-5B. Specific components within the embodiments will now be discussed.

Figure 6A:
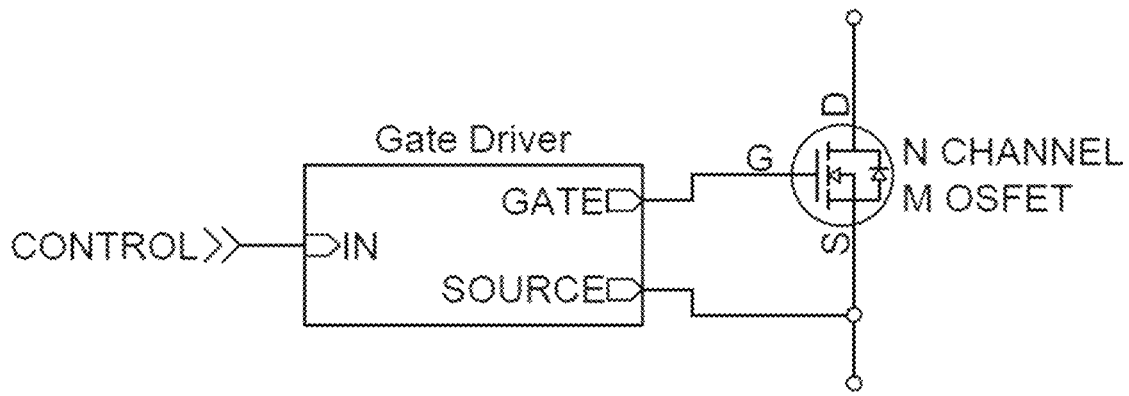
FIG. 6A shows a Prior Art MOSFET switch.
Figure 6B:
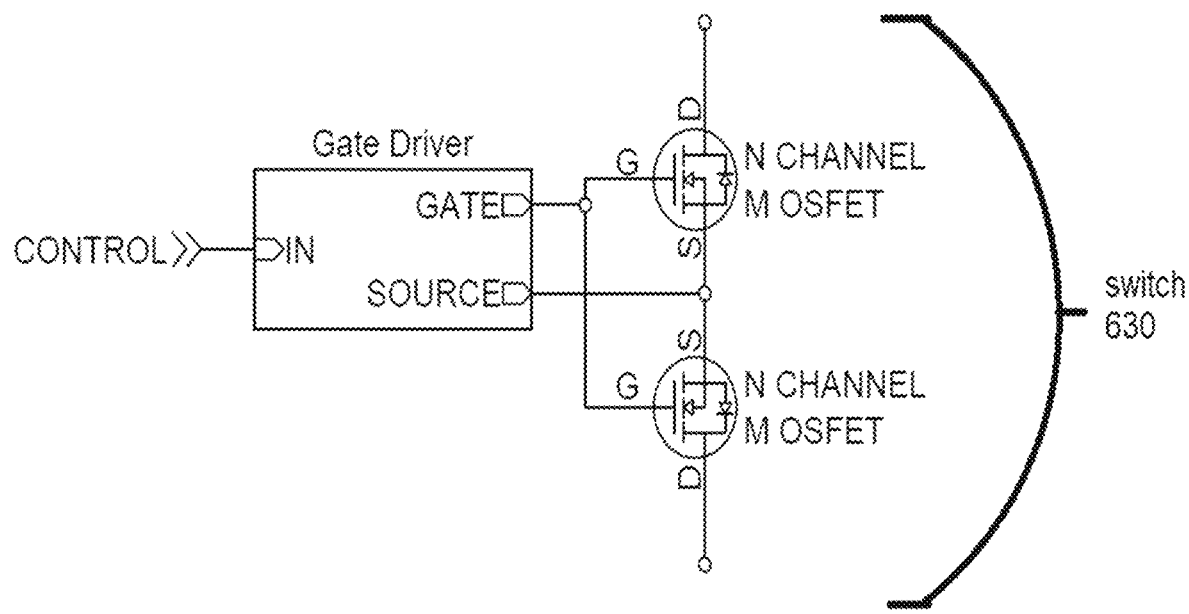
FIG. 6B shows an example MOSFET switch configured in a totem-pole arrangement.

FIG. 6B shows connecting two identical N-channel MOSFETs in a totem pole arrangement where their source terminals are common and their gate terminals are common results in a circuit that can be used as an AC switch 630 across the two drain terminals.

Meanwhile, for context, FIG. 6A (Prior Art) shows a conventional connection of a MOSFET device for SMPS applications. In either case, the gate driver 604 is required to control the state of the MOSFET switching device(s) B1\B2.

One challenging aspect for a gate driver 604 is that the drive voltage it produces (typically alternating between zero and 10 volts) must be referenced to the source of the MOSFET. For the high side device, this node is swinging from below zero to beyond the incoming power feed voltage at high speed and high frequency. The gate driver 604 drives the gate voltage of the MOSFET(s) to (typically)+10 volts relative to the source of the same device to turn on the MOSFET "switch", regardless of whether that source is at zero volts or −20V or +100V at any given instant. Incoming AC power is applied across the totem pole, and AC power is delivered at the output of the totem pole. This is accomplished as shown in FIG. 7.

The AC current source 190 creates special demands in this regard however because of its intended use for direct control of AC current. A close look at the circuit of FIG. 6B shows that the source node can never be more than one diode drop above the most negative drain of the two terminals of the switch. This is due to the intrinsic body diodes of the two n-channel MOSFETs. Only gate driver chips that provide complete isolation between the control input and the output drive are suitable, but these are difficult to find. The controller B3 is completely proprietary and had to be invented from scratch. Such chips are uncommon because the conventional circuit conditions are constrained to a single, relatively constant DC power feed. Most chips take advantage of this fact to provide techniques short of complete isolation but still get the job done in the much more constrained environment of constant DC power. The end result is that FIG. 6B shows how the core switching function essential to any SMPS design is solved for AC power.

Figure 7:
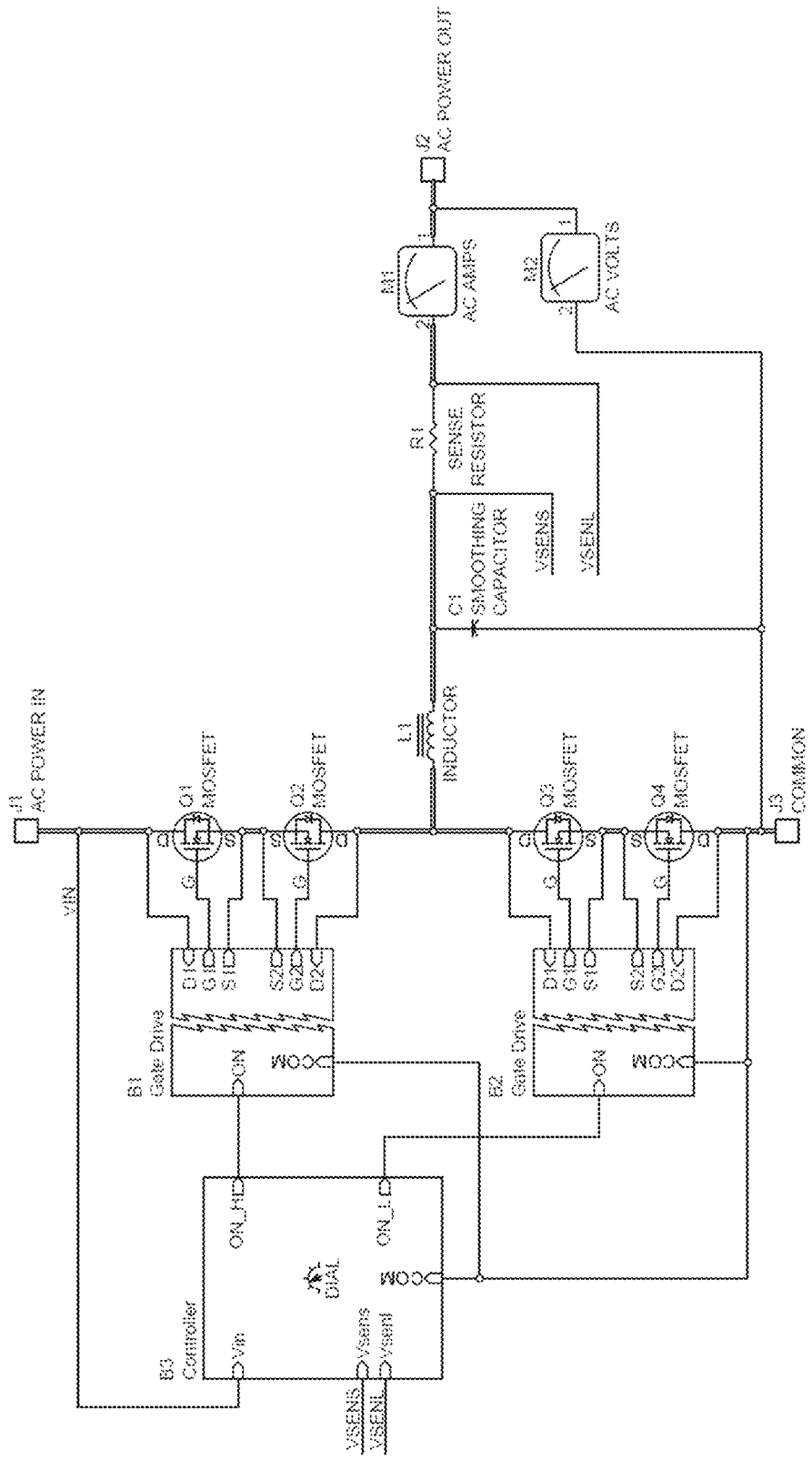
FIGS. 7-8 shows interior detail of the AC current source of FIGS. 5A-5B.

Following from that advancement shown in FIG. 6B, FIG. 7 shows how the gate drivers B1 & B2 facilitate control of this switching function while maintaining the complete isolation requirement just discussed.

FIG. 7 expands on FIGS. 5A-B and adds some detail. In FIGS. 7, B1 and B2 are drawn as expanded gate drivers B1\B2 shown with jagged white space down through the middle, so as to represent isolation of an input side from an output side. The ON input is a simple logic signal that tells a gate driver B1 or B2 whether to drive the MOSFETs on its output side into an ON state (ON input is "true") or to the OFF state (ON input is "false"). The MOSFET sources remain tied together but rather than tie the gates of the driven MOSFETs together as shown in FIG. 6B, the gates of each MOSFET are kept separate with each driven by its own dedicated gate driver circuit within the gate driver block. The two internal gate driver circuits are identical and are both driven from the same ON control input, so the resulting functionality is the same as achieved by the FIG. 6B configuration.

As mentioned earlier, one task of the controller B3 is to monitor the current being delivered to the load and adjust the on/off control of the n-channel MOSFETs to drive that current to a target (desired) level. The controller B3 uses the voltage developed across R1 to determine an amount of current to the load cell 190, and it monitors the voltage of the AC power feed on its Vin input to determine the target current level. There is a further adjustment of the target current level according to the control knob 504 present on each AC current source 190, where the current can be adjusted from zero to 100%.

By having an amount of current (amps) correspond with the input voltage in this manner, power-factor control becomes automatic. There is no need for an additional PFC (Power Factor Correction) stage as is often required in conventional SMPS designs.

The algorithm used by the controller B3 (e.g. FIGS. 5A-5B) works as follows: If the current to the load cell 194 is less than what is being called for as the target current, the upper switch (Q1 and Q2) of the buck converter 512 is turned on and the lower side (Q3 and Q4) is turned off. When the current to the load cell 194 exceeds the target current, the upper switch is turned off and the lower switch is turned on.

As with the configuration of the switching elements, the controller B3 is designed to work with AC power. As such, the controller B3 evaluates "less than" and "exceeds" in terms of absolute magnitude, not "less positive" or "more positive".

The function of the inductor L1 is to smooth out the change in current as the voltage swings from zero to the source voltage. When the buck converter 512 is ON, current through L1 will increase and when it is OFF, current through the inductor L1 will decrease. The function of the inductor L1 is to slow down the rate of increase and decrease so that it doesn't happen instantaneously. The job of the controller B3 is to time the ON and OFF portions of the cycle to keep the average current through the inductor L1 at the target level. There will necessarily be some ripple in the current. The C1 capacitor following the inductor L1 provides additional smoothing (ripple removal) of the output voltage before it is delivered to the load cell 194.

Figure 8:
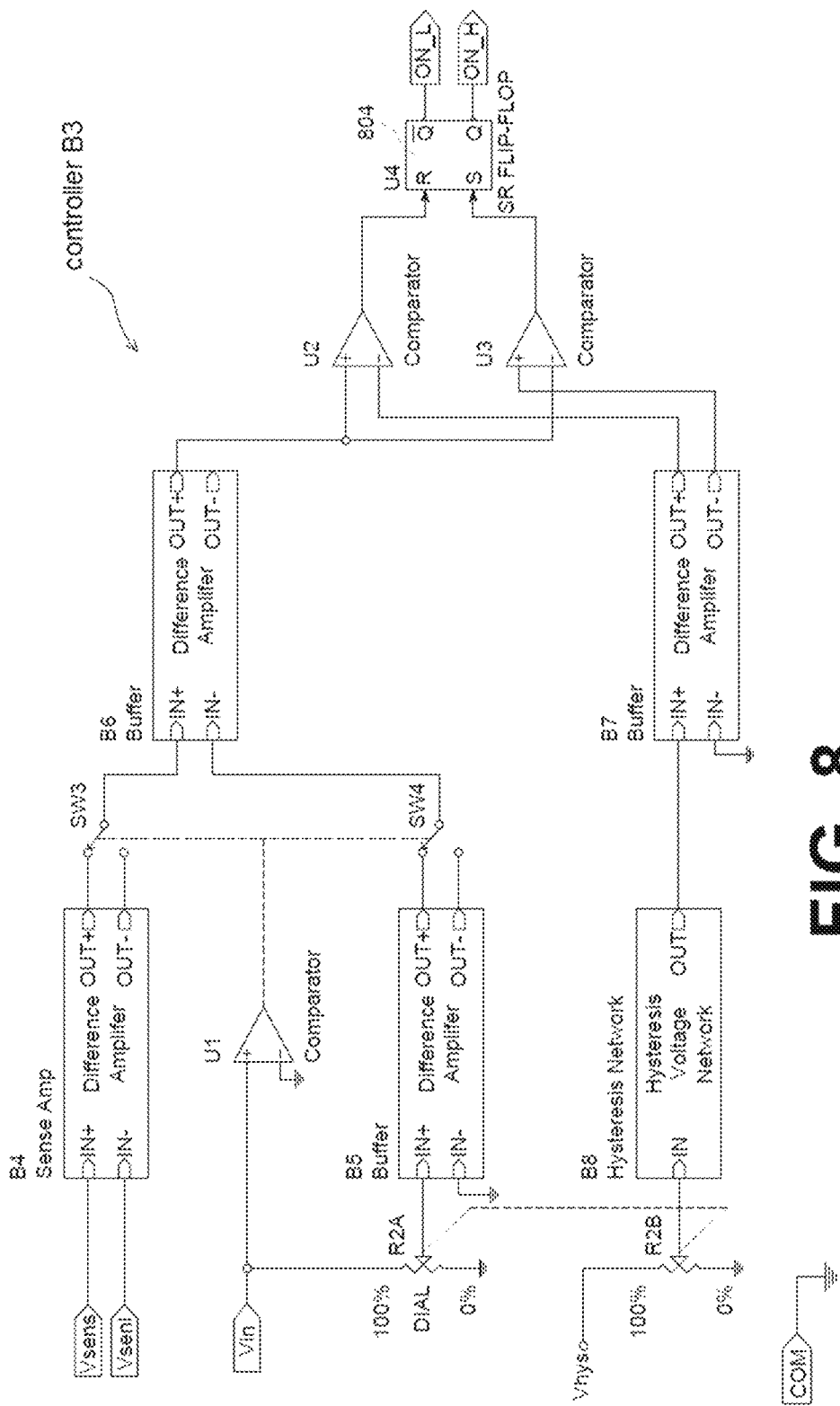

FIG. 8 is a non-limiting block diagram of the controller B3 (originally shown in FIGS. 5A-5B) and shows more detail about how its functionality could be implemented. There are many ways the various sub-functions could be implemented and interconnected, potentially deviating from what is shown here in specific detail, but still falling within the spirit and scope of the embodiments herein as defined by the claims. FIG. 8 provides simplicity and clarity while representing the main functions that must be performed. Accordingly, any alternative design that achieves the same functionality will be found to map to FIG. 8.

FIG. 8 shows a difference amplifier B4 (acting as a sense amp) that takes the millivolt-level signal from the R1 current-sense resistor, boosts it to a higher voltage level and provides both a positive and negative version of that signal on its two outputs. The difference amplifier B5 (acting as a buffer) takes the Vin signal after it has been scaled by the R2A potentiometer and similarly provides positive and negative versions of it on its outputs. The Vin signal is also monitored by a comparator U1 whose only job is to determine the polarity of the Vin signal at any given moment as it goes through its AC cycle. This comparator controls electronic switches depicted as SW3 and SW4 that select the appropriate output of the sense amp B4 and buffer B5 respectively so as to provide signals that always reflect the absolute magnitudes of the inputs regardless of whether they are in the positive or negative portion of the AC cycle.

The current-sense and Vin signals are applied to the input of buffer B6, another difference amplifier where only the positive output is used. The job of diff-Amp B6 (acting as a buffer) is to output a voltage that reflects the difference between the measured output current and the target output current. When this voltage becomes sufficiently positive, indicating output current is sufficiently exceeding the target current, the U2 comparator asserts the R input of the SR (set-reset) flip-flop causing the Q output to go low and the Q-bar output to go high.

The Q and Q-bar are the control signals (ON_H and ON_L) going to the gate drivers 604 (FIG. 6B), so the buck converter 512 is put into the state where the upper switch Q1 is turned off and the lower switch Q2 is turned on. This will cause the current delivered to the output to start decreasing. When it has dropped sufficiently below the target current level, U3 will set the SR flip-flop 804, causing the high side of the buck converter 512 to be turned on and the low side to be turned off, at which point current will start rising and the cycle repeats.

The amount of voltage sufficient to trip the comparators (positive for U2 and negative for U3) is called hysteresis and is a very important parameter in the control of a switching converter. This is addressed by the hysteresis network B8. The greater the hysteresis voltage limit, the more distance there is between the positive and negative trip points (e.g. comparators U2/U3) and the longer it takes for the current to ramp up and down between those two trip points. Hence, size of hysteresis has a direct effect on switching frequency.

Too little hysteresis and the buck converter 512 burns up because it is switching too fast. Too much hysteresis creates excess ripple in the output current. It is necessary to work this trade-off as appropriate for the application and adjust the circuit accordingly. The hysteresis discussed herein is not a straightforward relationship to the output-current. Consequently, the hysteresis network and its resistor components help maintain reasonable operation of the AC current source 190 over its operating range.

FIG. 8 shows a hysteresis voltage being supplied from the hysteresis network B8 to U2 and U3 via B7. The design of the AC current source 190 includes the ability to adjust the output current over a wide range. As such, the hysteresis voltage suppled to U2 and U3 must be adjusted as well to maintain reasonable operation. This is represented by R2B, a second section of the dual potentiometer R2 that controls the output current.

The hysteresis network B8 comprises a resistor arrangement which modifies the output from R2B according to the particulars of the design to maintain reasonable operation over the range created by R2A.

Figure 9:
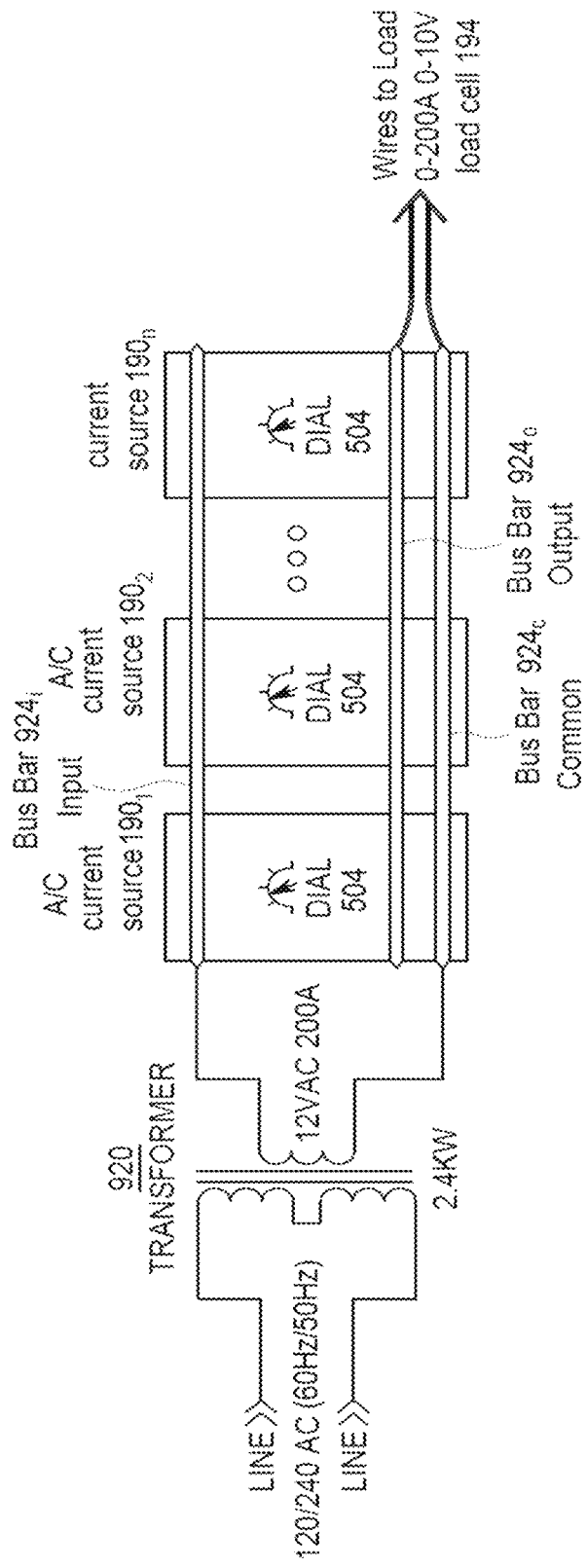
FIG. 9 shows grouping of >1 AC current sources so as to multiply an amount of available current.

FIG. 9 shows use of a single transformer 920 to source ~12 volts at up to 200 amps. As shown in FIG. 9, three of the AC current sources 190 in parallel can provide up to 100 amps. This arrangement could conceivably even be stretched to six units to obtain 200 amps. A top (upper) surface 912 of the PCB 904 would be designed with areas to mount and make contact with the bus bars. The bus bars 908 are structural as well as electrical, holding the desired number of PCBs in a straight row. The controls and indicators for each PCB 904 are mounted on the top (upper) surface as well. On the bottom/rear (back) of each PCB 904 is an L-shaped extrusion (not visible in FIG. 9) serving as its chassis and heat sink. In an embodiment, the base of the "L" could also make a foot for the overall assembly to stand up on. A row of these will just sit on a table or could be bolted down to a suitable base.

One can build a system as big or small as needed merely by determining the number of repeating, identical AC current sources 190 needed. Ideally, each AC current source 190 might have an output capacity of 33.33 amps. Using the transformer 920 shown in FIG. 9, up to six of these current sources 190 could be ganged in parallel to provide 200 amps of output. One AC current supply 190 might fit in a shoe box so a five- or six-foot bench or shelf might be needed to support a 200-amp system.

FIG. 9 shows that multiple AC current supplies 190 can all be driving a single gasification cell 194. In such a case, the AC current supplies 190 are electrically wired in parallel, not series or daisy-chain. In this manner, the currents add (accumulate) while the voltage is the same across all AC current supplies 190.

FIG. 9 shows the transformer 920 wired for either 120/240v AC. It could just as easily be wired to operate from a 120 VAC wall outlet, although in that case the arrangement would be limited to 3 AC current sources 190 (100 amps) because of power limitations of a standard 15 amp 120 VAC wall outlet.

The AC current supply 190 is not a conventional electrical circuit as might be used in household wiring. An embodiment will keep an output stage 924 isolated and floating so that the gasification cell 194 can be properly grounded for safety without introducing any shorts that might result from a conflicting ground connection at the source.

In an embodiment, the AC current supply 190 can have two black wires with 12 volts between them (if no load is connected) and floating (no particular voltage) with respect to the outside world.

The embodiments herein can output a voltage stabilized around e.g. 1.0 volts, yet produce a high volume of current.

The AC current supply 190 achieves stable operation at the user-selected current flow for any voltage from 0 to about 10 volts, and will adjust its voltage output as needed to make the (load) cell 194 draw the specified current. A stable output of 1.0 volts can be achieved regardless of conditions at the (load) cell 194 including whether that load cell 194 is at a maximum load or at a dead short.

All versions of the AC current supply 190 described herein still use a customized AC buck converter. However, a key innovation here is that it is a modernized or buck converter 512 rather than the conventional buck converter.

Conventional because they always requires a certain polarity applied to each of their terminals.

When multiple AC current supplies 190 are combined, it is necessary to correctly connect them. Each module has three terminals: Input, Output, and Common. All the Input terminals must be connected to each other, all the Output terminals must be connected to each other, and all the Common terminals must be connected to each other. This is accomplished by the bus bars 908 shown in FIG. 9 but may be accomplished by any method capable of providing the necessary connections and carrying the desired current.

Matching output impedance of an AC current supply 190 is not an issue. Since the one or more devices all act as current sources, they all look like high-impedance sources and their output currents will add, regardless of output voltage. They are all locked together for all AC power supplies 190 since their outputs would be hard-wired in parallel. One caution: if the gasification (load) cell 194 is in a metal vessel, the vessel should be connected to earth ground for safety.

As a result of all the foregoing, the AC current supply 190 provides a constant AC current to the load cell 194. If, for example, a control knob 504 is set to 30%, that AC current supply 190 will deliver 10 amps RMS to the load cell 194, regardless of whether 1 volt RMS is required or 10 volts RMS is required. It will even deliver 10 amps into a dead short, i.e., zero volts (theoretically) across the short without issue. If the load cell 194 fails to consume the current the AC Current source 190 is trying to supply per its control knob setting, the output voltage will rise until it reaches the voltage of the AC power fed to the AC Current source 190. The AC current supply 190 can only buck (attenuate \impede) the voltage it is given, it can never boost (increase) that voltage, thereby providing an intrinsic level of safety if low voltage is used.

FIG. 9 shows each AC current supply 190 being one of 1-n identical instances, all of which implements the power converter circuit described herein. For convenient reference, FIG. 9 shows three AC current supplies 190, but other numbers could be considered. The control knob 504 that allows adjusting an amount of current delivered to the load to be adjusted, up to a maximum that is determined by the details of the module's implementation. The bus bars 908 connect the various current sources 190 such that the total output current is the sum of all the individual modules' contributions. The single power transformer 920 provides AC power at the desired voltages (e.g. low) and current levels (e.g. high).

For example, if the transformer provides 12 volts at up to 200 amps and each module can deliver up to 33 1/3 amps, the use of 6 modules would be able to deliver 200 amps to a load cell 194. Further, even at a dead short, such an arrangement can maintain maximum amps at near to zero volts.

A final note: the AC Current source 190 is a three-terminal device. Most power supplies are four-terminal devices, two input terminals and two output terminals. Unfortunately, four terminal devices have a phasing hazard that simply doesn't exist for the 3-terminal design. The convenience of paralleling multiple units with a three-terminal design far outweighs the impact on the design of the device itself.

As shown at least within FIG. 9, an arrangement of AC current sources 190 has three terminals: Input 924$i$, Output 9240 and Common 924$c$. It is possible to gang a plurality of the AC current sources 190 by connecting the three terminals across all AC current sources 190. This is helpful because one can combine the output current of each AC current sources 190. In such a case, a total output current of the ganged scenario would be equal to the sum of the individual output currents of the AC current sources 190.

Next, an arrangement features various bus bars 908 for linking multiple AC current supplies, where one of the bus bars functions as an input, another functions as an output, and one functions as a common.

Disclaimer

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of configuring a power conversion system for providing AC power at sustainable current levels to a load cell, comprising:

configuring an AC generator for supplying AC power in a first voltage level;

feeding the first mode AC voltage to an AC module;

a buck converter reducing a voltage level of the first voltage level into a second voltage level;

a load sensor within the AC module maintaining a level of current to a set predetermined range;

the load sensor ensuring current flow stays within predetermined set boundaries;

supplying stabilized AC current at a set of output terminals located therein;

configuring an output of the power conversion system to be within a first predetermined amp-range and a predetermined voltage range;

where the first predetermined amp-range is between 10 and 10000 amps;

arranging the load cell to comprise electrodes for nucleating a specific water-based liquid into a hydrogen gas;

configuring the specific liquid to have an abundance $H_1+$ protons partly by breaking covalent bonds known to be present in water thereby separating out oxygen and electrons and isolating the remaining $H_1+$ protons into free single protons; and configuring the power conversion system so that as current is entering the electrodes, nucleation of the specific liquid begins by reforming the isolated $H_1+$ protons into H2 gas.

2. The method of claim 1, further comprising:

during instances of low or zero load impedance on the load, the load sensor ensuring the power conversion system not shutting off or overloading.

3. The method of claim 1, further comprising:

the load sensor making determinations about the load and assisting in making adjustments to ensure a steady current regardless of changes in load impedance.

4. The method of claim 3, further comprising:

configuring the load sensor to ensure the power conversion system supplies current that does not surpass a predetermined upper amount and also does not go below a predetermined lower amount; thereby ensuring the power conversion system acting both as a current limiting device but also as a current guaranteeing device.

5. The method of claim 4, further comprising:

combining two or more power conversion systems to comprise a single AC current source, the single AC current source comprising three terminals: input, output and common.

6. The method of claim 5, further comprising:

the single AC current source having a total output current equal to the sum of individual output currents of the two or more power conversion systems.

7. The method of claim 6, further comprising:

the single AC current source having three bus bars for linking the multiple power conversion systems, a first of the three bus bars functioning as an input;

a second of the three bus bars functioning as an output; and a third of the three bus bars functioning as a common.

8. The method of claim 1, further comprising:

the specific liquid being a Proton-Rich Ionic Fluid (PRIF).

9. The method of claim 8, further comprising:

the power conversion system providing electron-saturation sufficient to maintain nucleation within the load cell without degradation of the load cell.

10. The method of claim 8, further comprising:

reforming the PRIF into H2 gas using only $H_1+$ protons and not using any OH− ions.

* * * * *